US008424191B2

(12) United States Patent
Shimazawa et al.

(10) Patent No.: US 8,424,191 B2
(45) Date of Patent: Apr. 23, 2013

(54) METHOD FOR MANUFACTURING THERMALLY-ASSISTED MAGNETIC RECORDING HEAD BY SEMI-ACTIVE ALIGNMENT

(75) Inventors: Koji Shimazawa, Tokyo (JP); Seiichi Takayama, Tokyo (JP); Eiji Komura, Tokyo (JP); Osamu Shindo, Tokyo (JP); Takashi Honda, Shatin (HK)

(73) Assignee: TDK Corporation, Tokyo (JP)

( * ) Notice: Subject to any disclaimer, the term of this patent is extended or adjusted under 35 U.S.C. 154(b) by 432 days.

(21) Appl. No.: 12/648,079

(22) Filed: Dec. 28, 2009

(65) Prior Publication Data
US 2011/0157738 A1 Jun. 30, 2011

(51) Int. Cl.
*G11B 11/12* (2006.01)
(52) U.S. Cl.
USPC ... 29/603.1; 29/603.2; 29/603.22; 369/13.11; 369/13.13; 369/13.24
(58) Field of Classification Search ............... 29/603.07, 29/603.1, 603.2, 603.22, 407.04, 834; 369/13.11, 369/13.13, 13.24, 13.32
See application file for complete search history.

(56) References Cited

U.S. PATENT DOCUMENTS

| 4,860,276 | A | 8/1989 | Ukita et al. |
| 5,481,082 | A | 1/1996 | Yamamoto |
| 6,499,888 | B1 | 12/2002 | Wu |
| 6,757,221 | B1 * | 6/2004 | Uno et al. ............... 369/13.32 |
| 7,538,978 | B2 | 5/2009 | Sato et al. |
| 7,804,655 | B2 | 9/2010 | Shimazawa et al. |
| 2005/0213436 | A1 | 9/2005 | Ono et al. |
| 2008/0043360 | A1 | 2/2008 | Shimazawa et al. |
| 2008/0056073 | A1 | 3/2008 | Shimizu |
| 2008/0316872 | A1 * | 12/2008 | Shimizu et al. ............. 369/13.24 |
| 2009/0052078 | A1 | 2/2009 | Tanaka et al. |
| 2009/0059411 | A1 | 3/2009 | Tanaka et al. |
| 2011/0128827 | A1 | 6/2011 | Shimazawa et al. |
| 2011/0157738 | A1 | 6/2011 | Shimazawa et al. |
| 2011/0228649 | A1 | 9/2011 | Shimazawa et al. |
| 2011/0228653 | A1 | 9/2011 | Shimazawa et al. |
| 2011/0242697 | A1 | 10/2011 | Mori et al. |

FOREIGN PATENT DOCUMENTS

| JP | A 61-174791 | 8/1986 |
| JP | 04204002 A * | 7/1992 |

(Continued)

OTHER PUBLICATIONS

Oct. 17, 2011 Office Action issued in U.S. Appl. No. 12/728,510.

(Continued)

*Primary Examiner* — A. Dexter Tugbang
(74) *Attorney, Agent, or Firm* — Oliff & Berridge, PLC

(57) ABSTRACT

A method for manufacturing a thermally-assisted magnetic recording head is provided, in which joined are: a light source unit that includes a light source having a surface including a light-emission center on the joining surface side of a unit substrate; and a slider that includes an optical system having a light-receiving end surface reaching a back surface opposite to the opposed-to-medium surface. This method utilizes "semi-active alignment" that uses an alignment light, and comprises steps of: causing a light to enter the light source from a surface opposite to the light-emission center; detecting the light that has passed through the light source and is emitted from the light-emission center to align the light-emission center with the light-receiving end surface of the slider; and bonding the light source unit to the slider. This manufacturing method can achieve the alignment with a sufficiently high alignment accuracy in a short processing time.

8 Claims, 9 Drawing Sheets

FOREIGN PATENT DOCUMENTS

| | | |
|---|---|---|
| JP | A 8-181388 | 7/1996 |
| JP | A 11-185232 | 7/1999 |
| JP | A 2003-142892 | 5/2003 |
| JP | A 2009-301597 | 12/2009 |

OTHER PUBLICATIONS

U.S. Appl. No. 12/628,761 in the name of Shimazawa et al. filed Dec. 1, 2009.

U.S. Appl. No. 12/726,981 in the name of Shimazawa et al. filed Mar. 18, 2010.

U.S. Appl. No. 12/728,510 in the name of Shimazawa et al. filed Mar. 22, 2010.

Jan. 24, 2012 Notice of Allowance issued in U.S. Appl. No. 12/728,510.

Rottmayer et al.; "Heat-Assisted Magnetic Recording;" IEEE Transactions on Magnetics; vol. 42; No. 10; Oct. 2006; pp. 2417-2421.

Jul. 19, 2012 Notice of Allowance issued in U.S. Appl. No. 12/751,104.

* cited by examiner

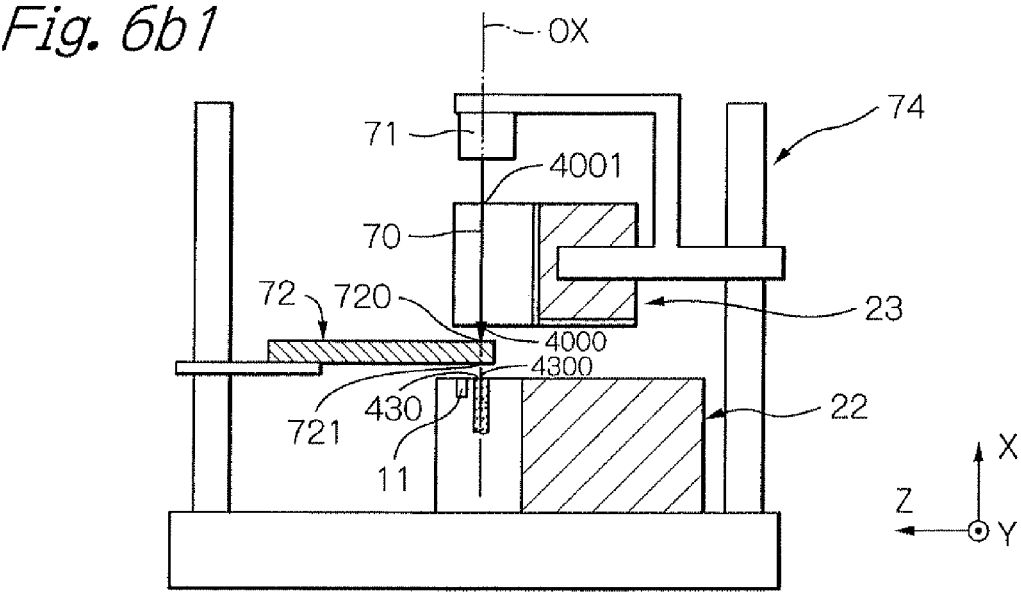
Fig. 6b1
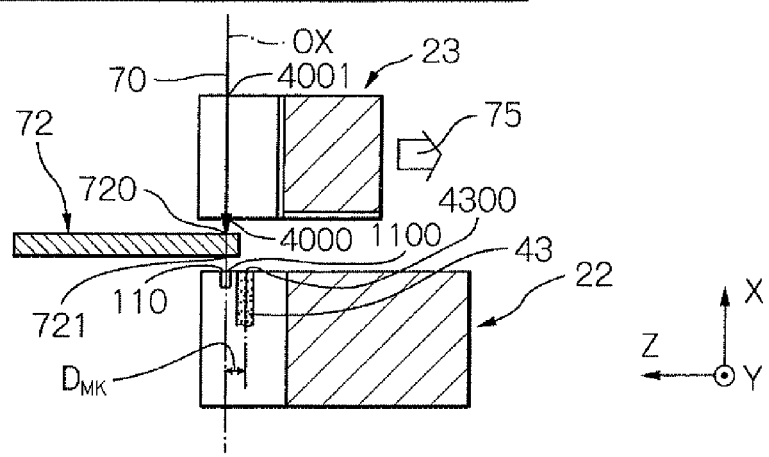
Fig. 6b2
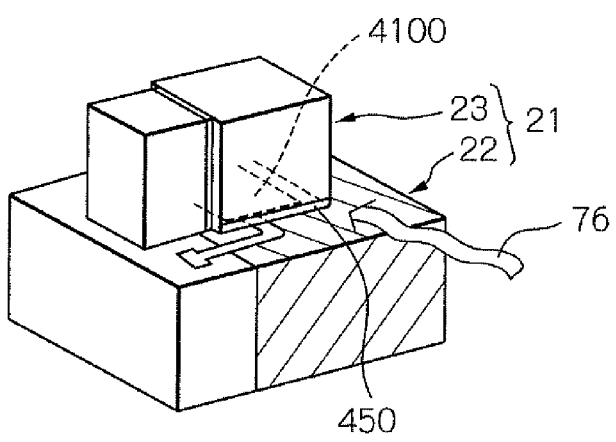
Fig. 6c

METHOD FOR MANUFACTURING THERMALLY-ASSISTED MAGNETIC RECORDING HEAD BY SEMI-ACTIVE ALIGNMENT

BACKGROUND OF THE INVENTION

1. Field of the Invention

The present invention relates to a thermally-assisted magnetic recording head fabricated by joining a slider and a light source unit that includes a light source, and further relates to a method for manufacturing the thermally-assisted magnetic recording head.

2. Description of the Related Art

As the recording densities of magnetic recording apparatuses become higher, as represented by magnetic disk apparatuses, further improvement has been required in the performance of thin-film magnetic heads and magnetic recording media. As the thin-film magnetic heads, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic grains gathered together, and each of the magnetic grains has a single magnetic domain structure. Here, one record bit consists of a plurality of the magnetic grains. Therefore, in order to improve the recording density, it is necessary to decrease the size of the magnetic grains and reduce irregularity in the boundary of the record bit. However, the decrease in size of the magnetic grains raises a problem of degradation in thermal stability of the magnetization due to the decrease in volume.

As a measure against the thermal stability problem, it may be possible to increase the magnetic anisotropy energy $K_U$ of the magnetic grains. However, the increase in energy $K_U$ causes the increase in anisotropic magnetic field (coercive force) of the magnetic recording medium. Whereas, the intensity of write field generated from the thin-film magnetic head is limited almost by the amount of saturation magnetic flux density of the soft-magnetic material of which the magnetic core of the head is formed. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there has been generally used a method in which a magnetic recording medium is irradiated and thus heated with a light such as near-field light. In this case, it is significantly important to stably supply a light with a sufficiently high intensity at a desired position on the magnetic recording medium. However, from the beginning, more significant problem to be solved exists in where and how a light source with a sufficiently high output of light should be disposed inside a head.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

As described above, various types of the setting of the light source are suggested. However, the present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1. The advantages of the thermally-assisted magnetic recording head with the "composite slider structure" are as follows:

a) The head has an affinity with the conventional manufacturing method of thin-film magnetic heads because the opposed-to-medium surface and the element-integration surface are perpendicular to each other in the slider.

b) The light source can avoid suffering mechanical shock directly during operation because the light source is provided far from the opposed-to-medium surface.

c) The light source such as a laser diode and the head elements can be evaluated independently of each other; thus the degradation of manufacturing yield for obtaining the whole head can be avoided; whereas, in the case that all the light source and head elements are provided within the slider, the manufacturing yield rate for obtaining the whole head is likely to decrease significantly due to the multiplication of the process yield for the light-source and the process yield for the head elements.

d) The head can be manufactured with reduced man-hour and at low cost, because of no need to provide the head with optical components such as a lens or prism which are required to have much high accuracy, or with optical elements having a special structure for connecting optical fibers or the like.

In fabrication of a thermally-assisted magnetic recording head having such a "composite slider structure", it is significantly important to accurately align the light source unit with the slider when joining them together.

In practice, the head need to be fabricated in such a way that light emitted from the light-emission center located in the light-emitting surface of the light source is reliably allowed to be incident exactly at the light-receiving end of an optical system such as a waveguide located on the back surface of the slider in order to provide a sufficiently high light use efficiency. To this end, the light-emission center and the light-receiving end are aligned with each other in the track width direction and in the direction perpendicular to the track width direction as accurately as possible. Typically, it is preferable that the accuracy of the alignment be within ±1 µm (micrometer) in actual manufacturing.

One approach to achieving such high alignment accuracy is active alignment. In the active alignment, a light source such as a laser diode is actually being activated while the light source and the optical system are moved relative to each other, light emitted from the light source and incident at the light-receiving end of the optical system is monitored on the light-emitting end side of the optical system in real time, and a monitoring position at which the highest light intensity is obtained is set as the desired relative position of the light source and the optical system. However, the active alignment is a method of merely locating a two-dimensional optimum position and has the drawback of requiring a considerably long time for alignment. In addition, power supply probes need to be applied to the electrodes of the light source in order to keep activating the light source during the alignment, which further increase the time required for the alignment. Furthermore, a head structure and probing facilities which are required for the probing increase the manufacturing load.

There is another approach called passive alignment. In the passive alignment, a light source and an optical system are physically coupled to each other or are moved through image recognition, thus to align them with each other using an existing groove, an existing projection, or a marker provided in the light source and/or the optical system as a mark for alignment. In general, the passive alignment takes a shorter time than the active alignment. However, the accuracy of the passive alignment tends to be low compared with the active alignment. In addition, it is considerably difficult to find or add a marker for the passive alignment on the light-source unit during fabrication of a head having the "composite slider structure".

In practice, in the "composite slider structure", the alignment target in the light source unit is the light-emission center located in the light-emitting surface of the light source. If the light source is an edge-emitting laser diode, an end of a ridge structure located at the light-emitting surface of the diode is as small as approximately $2 \times 2$ $\mu m^2$, for example, and is difficult to observe. Furthermore, even if the end can be observed, it is extremely difficult to identify the light-emission center in the end of the ridge structure. It may be contemplated to provide a marker for passive alignment on the light-emitting surface. However, provision of a light source, such as a laser diode, to which a maker suitable for image recognition is given will significantly increase manufacturing cost.

Therefore, there is a need for a novel alignment method capable of aligning a light source unit and a slider with each other with a sufficiently high alignment accuracy in a short processing time in fabrication of a thermally-assisted magnetic recording head having a "composite slider structure".

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a method for manufacturing a thermally-assisted magnetic recording head in which a light source unit and a slider are joined to each other is provided. The light source unit includes a light source that is provided in a source-installation surface adjacent to a joining surface of a unit substrate and has a surface including a light-emission center on the joining surface side. The slider includes an optical system that is provided on an element-integration surface adjacent to an opposed-to-medium surface of a slider substrate and has a light-receiving end surface reaching a back surface opposite to the opposed-to-medium surface. The manufacturing method according to the present invention comprises the steps of:

causing a light to enter the light source from a surface opposite to the surface including the light-emission center of the light source while the joining surface of the light source unit is opposed to the back surface of the slider;

detecting the light that has passed through the light source and is emitted from the light-emission center to align the light-emission center of the light source unit with the light-receiving end surface of the slider; and bonding the light source unit to the slider in such a way that the bonding surface and the back surface face to each other.

This manufacturing method according to the present invention utilizes an alignment method that uses a light for alignment that is entered into the light source from the opposite side to the light-emission center and is emitted from the light-emission center. This alignment method is hereinafter referred to as "semi-active alignment". The "semi-active alignment" can achieve the alignment of the light source unit and the slider with a sufficiently high alignment accuracy in a short processing time.

As one embodiment of the manufacturing method according to the present invention, it is preferable that a multi-field-of-view microscope is inserted between the joining surface of the light source unit and the back surface of the slider; and an alignment of the light-receiving end surface and the light-emission center is performed by using the multi-field-of-view microscope in such a way that the light-receiving end surface or a marker that is in a predetermined positional relation with the light-receiving end surface is captured by a different field of view from a field of view that captures a light emitted from the light-emission center. Here, a dual-field-of-view microscope is preferably used as the multi-field-of-view microscope, which comprises two objective lenses in respective upper and lower surfaces of the microscope, optical axes of the two objective lenses being in a predetermined positional relation with each other.

As another embodiment of the manufacturing method according to the present invention, it is preferable that the light source unit and the slider are moved relative to each other from reference positions by a predetermined amount to align the light source unit and the slider with each other, the reference positions being positions in which the light-emission center and the light-receiving end surface are located when a light emitted from the light-emission center, reflected by a marker, reentering the light source, and then passing through the light source, is emitted from the surface opposite to the surface including the light-emission center, the marker being provided on the back surface of the slider and being in a predetermined positional relation with the light-receiving end surface. Further, in this embodiment, it is more preferable that the alignment of the light source unit and the slider is performed using reference positions in which the light-emission center and the light-receiving end surface are located when an intensity of the light that reenters the light source and is emitted from the surface opposite to the surface including the light-emission center becomes maximum.

In the above-described another embodiment, it is also preferable that a marker layer made of a material that reflects the light is formed at a position above the element-integration surface of the slider substrate and apart from the optical system with a predetermined distance in a direction perpendicular to the element-integration surface, and an end surface of the marker layer is used as the marker, the end surface reaching the back surface. The distance can be controlled with an ultrahigh accuracy achieved by thin-film formation technology. Further, in the another embodiment, it is also preferable that an alignment in a track width direction of the light source and the light-receiving end surface is performed by using an additional marker that is provided in the element-integration surface of the slider substrate and is in a predetermined positional relation with the light-receiving end surface in the track width direction. Furthermore, it is preferable that a distance between the surface including the light-emission center of the light source and the back surface is set to be 2 μm (micrometers) or more and to be 20 μm or less when aligning the light-emission center of the light source unit and the light-receiving end surface of the slider with each other.

According to the present invention, a slider is further provided, which is to be joined to a light source unit by the above-described manufacturing method to form a thermally-assisted magnetic recording head, the light source unit including a light source that is provided in a source-installation surface adjacent to a joining surface of a unit substrate and has a surface including a light-emission center on the joining surface side. The slider comprises:

a slider substrate including an opposed-to-medium surface;

a write head element provided in an element-integration surface adjacent to the opposed-to-medium surface of the slider substrate, for writing data on a magnetic recording medium;

an optical system provided in the element-integration surface of the slider substrate and having a light-receiving end surface reaching to a back surface of the slider, for propagating a light for thermal assist to the opposed-to-medium surface side; and a marker provided on the back surface of the slider and being in a predetermined positional relation with the light-receiving end surface.

In this slider according to the present invention, it is preferable that a marker layer made of a material that reflects a light for alignment is provided at a position above the element-integration surface of the slider substrate and apart from the optical system with a predetermined distance in a direction perpendicular to the element-integration surface, and the marker is an end surface of the marker layer, the end surface reaching the back surface of the slider. Further, it is also preferable that an additional marker that is in a predetermined positional relation with the light-receiving end surface in the track width direction is provided in the element-integration surface of the slider substrate.

According to the present invention, a thermally-assisted magnetic recording head is furthermore provided, which comprises: a light source unit comprising a light source provided in a source-installation surface adjacent to a joining surface of a unit substrate; and a slider as claimed in claim 9 that is joined with the light source unit, a surface that includes the light-emission center of the light source being positioned on the joining surface side.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 6a to 6c show schematic views illustrating one embodiment of a method for manufacturing the thermally-assisted magnetic recording head using the semi-active alignment according to the present invention.

DESCRIPTION OF THE PREFERRED EMBODIMENTS

Figure 1:
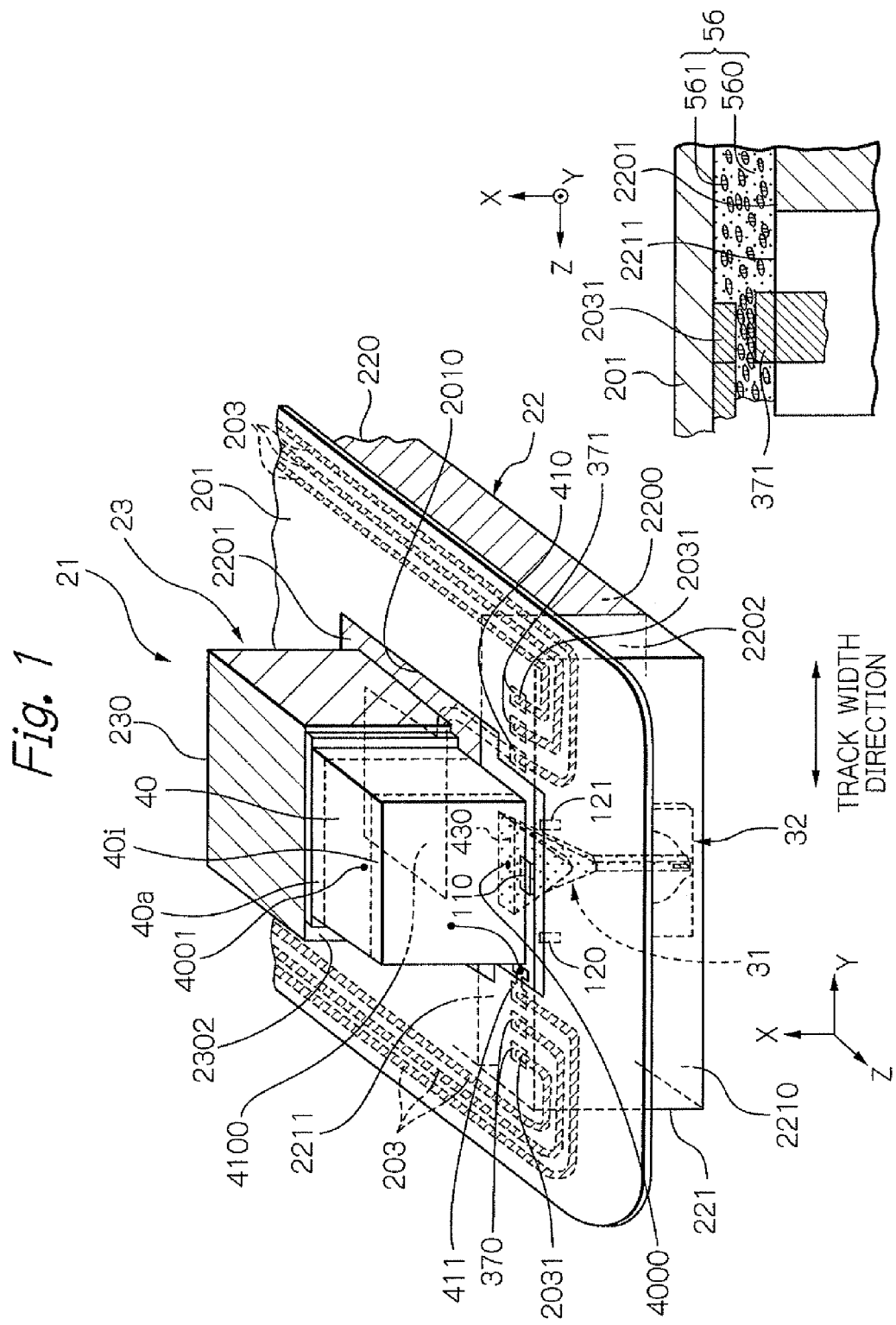
FIG. 1 shows a perspective view and a cross-sectional view schematically illustrating an embodiment in which a thermally-assisted magnetic recording head according to the present invention is attached on a flexure of a head gimbal assembly (HGA)

FIG. 1 shows a perspective view and a cross-sectional view schematically illustrating an embodiment in which a thermally-assisted magnetic recording head 21 according to the present invention is attached on a flexure 201 of a head gimbal assembly (HGA). In the perspective view, the side of the head 21 opposed to the surface of the magnetic disk is turned downward.

As shown in FIG. 1, the thermally-assisted magnetic recording head 21 is constituted by joining a light source unit 23 including a laser diode 40 as a light source to a slider 22. The slider 22 includes a slider substrate 220 and a head element part 221 provided on the element-integration surface of the slider substrate 220. The head element part 221 includes: an optical system 31 for guiding laser light generated from the laser diode 40 toward the opposed-to-medium surface side and for generating a light (near-field light) for thermal assist; and a head element 32 for writing and reading data. Further, a flexure 201 has an aperture 2010; the light source unit 23 protrudes from the aperture 2010 on the side opposite to the slider 22 in relation to the flexure 201.

Further, the slider 22 includes a pair of terminal electrodes 370 and a pair of terminal electrodes 371, which are provided for the head element 32, and two terminal electrodes 410 and 411 for the laser diode 40. These terminal electrodes 370, 371, 410 and 411 are electrically connected to the connection pads 2031 of a wiring member 203 provided on the flexure 201. The terminal electrode 410 is electrically connected to a back surface electrode 4100 that is provided on the end surface (back surface) 2201 of the slider substrate 220 and is formed of a conductive material such as gold (Au) or Au alloy, the back surface 2201 being opposite to the opposed-to-medium surface (air bearing surface: ABS) 2200 of the slider substrate 220. Further, the terminal electrode 410 is electrically connected to n-electrode layer 40a of the laser diode 40 through the back surface electrode 4100. The terminal electrode 411 is electrically connected to p-electrode layer 40i of the laser diode 40. This connection between the terminal electrodes 411 and the p-electrode layer 40i can be achieved by wire bonding, or by solder ball bonding (SBB) with use of a solder.

Fixing of the head 21 onto the flexure 201 and electrical connection of terminal electrodes 370, 371, 410 and 411 to connection pads 2031 of the wiring member 203 can be performed at a time by using an anisotropic conductive resin 56 as illustrated in the cross-sectional view shown in FIG. 1. The anisotropic conductive resin 56 includes: an adhesive portion 560 made of an ultraviolet (UV) curable resin such as UV curable epoxy resin or UV curable acrylic resin, which hardens on exposure to ultraviolet light, or a thermosetting resin, which hardens when heated; and a conductive filler 561 dispersed in the adhesive portion 560, made of metal particles such as silver (Ag) particles or plastic particles coated with a metal. The anisotropic conductive resin 56 is provided between the flexure 201 and the back surface 2201 of the slider substrate 220 as well as the end surface 2211 of the head element part 221, and bonds them together. The anisotropic conductive resin 56 is also provided between each of the terminal electrodes 370, 371, 410 and 411 and the connection pad 2031. The anisotropic conductive resin is described in Japanese Patent Publication No. 11-185232, for example. Alternatively, each of the terminal electrodes 370, 371, 410 and 411 can be electrically connected to its corresponding connection pad 2031 by using other means, for example wire bonding, instead of the anisotropic conductive resin 56.

In the mode in which the thermally-assisted magnetic recording head 21 is mounted on the flexure 201 as described above, stable fixation and proper electrical connection can be achieved even though the light source unit 23 is protruded from the slider 22. In particular, since the terminal electrodes 370, 371, 410 and 411 of the head 21 are concentrated on the end surface 2211, the wiring member 203, which is electrically connected to these terminal electrodes, needs to be provided only on one of the surfaces of the flexure 201 (that is on the slider side). The arrangement of the wiring member 203 further ensures the electrical connection to the terminal electrodes of the head 21 and also facilitates the fabrication of the head gimbal assembly (HGA), contributing to increase of the production yields.

Figure 2:
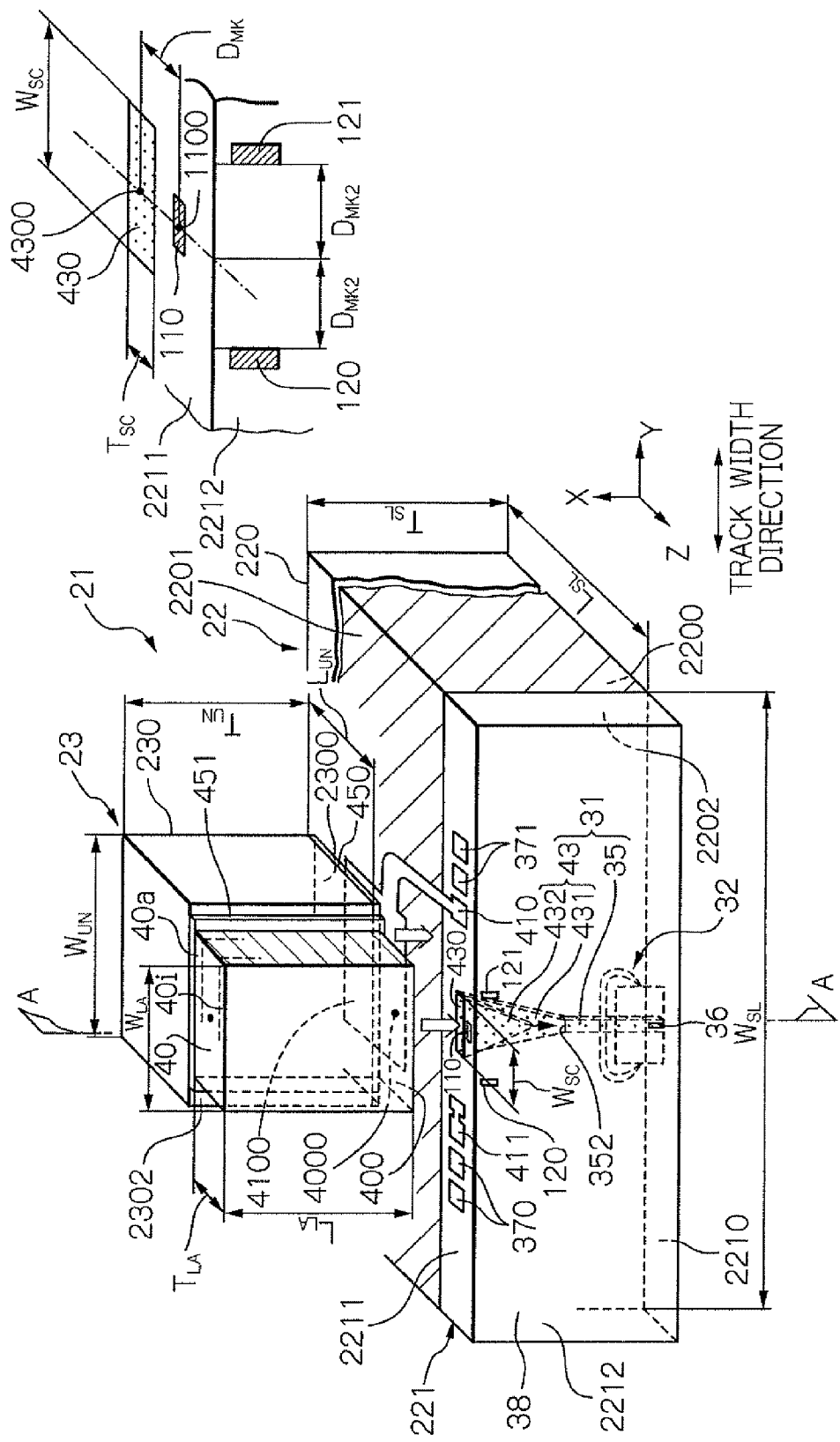
FIG. 2 shows a perspective view illustrating one embodiment of the thermally-assisted magnetic recording head according to the present invention.

FIG. 2 shows a perspective view illustrating one embodiment of the thermally-assisted magnetic recording head 21 according to the present invention.

As shown in FIG. 2, a thermally-assisted magnetic recording head 21 is constituted of a slider 22 and a light source unit 23 as described above. The slider 22 includes: a slider substrate 220 having an air bearing surface (ABS) 2200 processed so as to provide an appropriate flying height, and formed of, for example, AlTiC ($Al_2O_3$—TiC); and a head element part 221 formed on an element-integration surface 2202 that is perpendicular to and adjacent to the ABS 2200. While, the light source unit 23 includes: a unit substrate 230 having an joining surface 2300, and formed of, for example, AlTiC ($Al_2O_3$—TiC); and a laser diode 40 as a light source provided on a source-installation surface 2302 that is perpendicular to and adjacent to the joining surface 2300. The slider 22 and the light source unit 23 are bonded to each other in such a way that the back surface 2201 of the slider substrate 220 and the joining surface 2300 of the unit substrate 230 are opposed to each other.

In the slider 22, the head element part 221 formed on the element-integration surface 2202 of the slider substrate 220 includes: a head element 32 constituted of a magnetoresistive (MR) element 33 for reading data from a magnetic disk and an electromagnetic transducer 34 for writing data to the magnetic disk; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 or its vicinity; a surface plasmon generator 36 that generates near-field light for thermal assist; and an overcoat layer 38 formed on the element-integration surface 2202 so as to cover the head element 32, the spot-size converter 43, the waveguide 35 and the surface plasmon generator 36. Here, the spot-size converter 43, the waveguide 35 and the surface plasmon generator 36 constitute the optical system 31 for generating near-field light in the head 21.

One ends of the MR element 33, the electromagnetic transducer 34 and the surface plasmon generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into near-field light in the surface plasmon generator 36. Then, a portion to be written of the magnetic recording layer is irradiated and thus heated with the near-field light. As a result, the anisotropic magnetic field (coercive force) of the portion is decreased to a value that enables writing; thus the thermally-assisted magnetic recording can be achieved.

Referring also to FIG. 2, the spot-size converter 43 is an optical element which receives, at its light-receiving end surface 430 having a width $W_{SC}$ in the track width direction (the Y-axis direction), laser light emitted from the laser diode 40, converts the laser light to laser light with a smaller spot diameter with a low loss while maintaining a single mode, and then guides the converted laser light to a light-receiving end surface 352 of the waveguide 35. The spot-size converter 43 in the present embodiment includes a lower propagation layer 431 and an upper propagation layer 432. The lower propagation layer 431 has a width in the track width direction (the Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 µm (micrometers), for example. The thickness $T_{SC}$ (in Z-axis direction) at the light-receiving end surface 430 may be in the range of approximately 1 to 10 µm, for example. The light-receiving end surface 430 is preferably inclined at a predetermined acute angle, for example at an angle of approximately 4 degrees with respect to the end surface 400 including the light-emission center 4000 of the laser diode 40. Such angle prevents laser light reflected by the light-receiving end surface 430 from returning to the light-emission center 4000. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. One side surface of the waveguide 35 near the end surface 350 faces a surface plasmon generator 36. This allows laser light (waveguide light) incident through the light-receiving end surface 352 and traveling through the waveguide 35 to reach the portion facing the surface plasmon generator 36.

The head element part 221 further includes a marker 110 on the end surface 2211 that is a portion of the back surface of the slider 22. The marker 110 is made of a material such as a metal that reflects alignment light used in "semi-active alignment" according to the present invention, which will be described later in detail. The marker 110 is in a predetermined positional relation with the light-receiving end surface 430 of the spot-size converter 43. For example, the marker 110 is provided on the trailing side (+Z side) at a distance $D_{MK}$ (from the light-receiving end surface 430. The distance $D_{MK}$ (is the distance between the center 4300 of the light-receiving end surface 430 and the center 1100 of the marker 110 in Z-axis direction and can be set to a value in the range of 1 to 5 µm, for example. Preferably, the center line that passes through the center 4300 of the light-receiving end surface 430 along Z-axis direction coincides with the center line that passes through the center 1100 of the marker 110 along Z-axis direction. The "semi-active alignment" according to the present invention can be accomplished by using the marker 110, as will be detailed later. The marker 110 may alternatively be provided on the back surface 2201 of the slider substrate 220.

The head element part 221 further includes additional markers 120 and 121 on its upper surface 2212 (which is the upper surface of an overcoat layer 38). The additional markers 120 and 121 are made of a metal such as Au (gold) and are large enough in area to be observable under a microscope during alignment. The additional markers 120 and 121 are in predetermined positional relations with the light-receiving end surface 430 of the spot-size converter 43 in the track width direction (Y-axis direction) and are provided at distances $-D_u$ and $D_{MK2}$, respectively, in the track width direction from the center line that passes through the center 4300 of the light-receiving end surface 430 along Z-axis direction. The distance $D_{MK2}$ can be set to a value in the range of 1 to 5 µm, for example. The additional markers 120 and 121 enable reliable alignment between the slider 22 and the light source unit 23 in Y-axis direction during fabrication of the head, as will be described later in detail. The number of additional markers is not limited to two; a single marker or more than two markers may be provided in (a) predetermined positional relation(s) with the light-receiving end surface 430 in the track width direction.

Referring again to FIG. 2, the light source unit 23 includes: a unit substrate 230 having a joining surface 2300; and a laser diode 40 provided on the source-installation surface 2302 which is perpendicular to and adjacent to the joining surface 2300 of the unit substrate 230. A first unit electrode 450 is provided on the joining surface 2300 of the unit substrate 230, and a second unit electrode 451 is provided on the source-installation surface 2302 of the unit substrate 230. The first unit electrode 450 and the second unit electrode 451 cover the two respective adjacent end surfaces of the unit substrate 230 so that the first and second unit electrodes 450 and 451 are electrically interconnected and form an integral electrode. The first and second unit electrodes 450 and 451 may be formed by a foundation layer of a material such as Ta or Ti with a thickness of approximately 10 nm (nanometers), for example, and a conducting layer stacked on the foundation layer and formed of a conductive material such as gold (Au), copper (Cu) or an alloy of Au with a thickness in the range of approximately 1 to 5 µm, for example.

The laser diode 40 is provided on the source-installation surface 2302 in such a manner that an n-electrode layer 40a and the second unit electrode 451 are bonded together and electrically interconnected. The light source unit 23 on which the laser diode 40 is mounted is mounted on the slider 22 in such a manner that the first unit electrode 450 and the back surface electrode 4100 provided on the back surface 2201 of the slider substrate 220 are bonded together and electrically interconnected. Accordingly, the terminal electrode 410 provided on the head end surface 2211 of the slider 22 is electrically connected to the n-electrode layer 40a of the laser diode 40 through the back surface electrode 4100 and the first and second unit electrodes 450 and 451. The back surface electrode 4100 bonded with the first unit electrode 450 functions as an electrode for supplying power to the light source provided on the slider 22. When a predetermined voltage is applied between the n-electrode layer 40a and a p-electrode layer 40i of the laser diode 40 through the terminal electrodes 410 and 411 in the thermally-assisted magnetic recording head 21 completed by joining the light source unit 23 to the slider 22, the laser diode 40 oscillates and laser light is emitted from the light-emission center 4000.

As also shown in FIG. 2, the slider substrate 220 is, for example, a so-called Femto slider having a thickness (in X-axis direction) $T_{SL}$ of 230 µm, a width $W_{SL}$ of 700 µm in the track width direction (Y-axis direction), and a length $L_{SL}$ (in Z-axis direction) of 850 µm. The Femto slider is commonly used as the substrate of a thin-film magnetic head capable of achieving a high recording density and is the smallest in standardized size among the currently used sliders. The back surface 2201 of the slider substrate 210 in this case has an area of 850 µm ($L_{SL}$)×700 µm ($W_{SL}$). The area contains the region in which the back-surface electrode 4100 is to be formed and the light source unit 23 is to be mounted and the region to be bonded to the flexure 201 (FIG. 1).

On the other hand, the unit substrate 230 is somewhat smaller than the slider substrate 220. In particular, the width W of the unit substrate 230 in the track width direction (Y-axis direction) is preferably smaller than the width $W_{SL}$ of the slider substrate 220, greater than or equal to the width $W_{LA}$, of the laser diode 40 in the track width direction (Y-axis direction), and less than or equal to 1.5 times the width W. The unit substrate 230 may have a thickness $T_{UN}$ (in X-axis direction)

of 320 μm, a width $W_{UN}$ in the track width direction (in Y-axis direction) of 300 μm, and a length $L_{UN}$ (in Z-axis direction) of 250 μm, for example, if the laser diode 40 to be used has a length $L_{LA}$ of 300 μm and a width $W_{LA}$ of 200 μm, for example. The height $T_{LA}$ of the laser diode 40 is in the range of, for example, 60 to 200 μm. As seen from the above, the light source unit 23 according to the present invention can be adequately reduced in size to reduce the weight. The reduction of the weight maintains and enhances the flying performance and impact resistance of the head 21 in operation which has the light source unit 23 mounted on the slider 22 and is attached to the flexure 203 (FIG. 1).

Referring again to FIG. 2, the thermally-assisted magnetic recording head 21 has the structure in which the slider 22 and the light source unit 23 are interconnected as described above. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, the reduction of production yield of the entire heads due to the rejection rate of the laser diodes 40 can be avoided.

Figure 3:
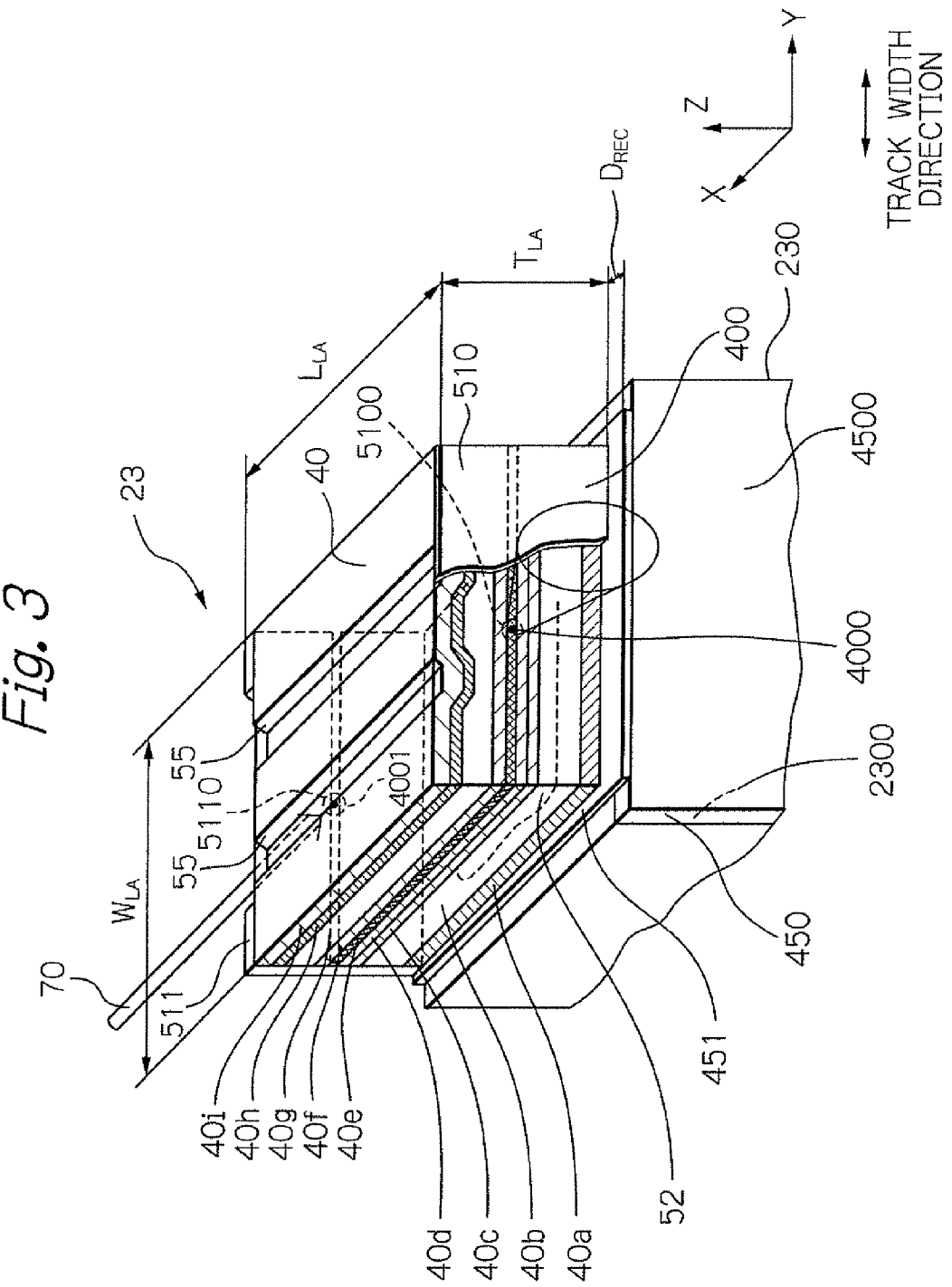
FIG. 3 shows a perspective view illustrating the structure of the laser diode and the state of joining the laser diode to the unit substrate.

FIG. 3 shows a perspective view illustrating the structure of the laser diode 40 and the state of joining the laser diode 40 to the unit substrate 230.

According to FIG. 3, the laser diode 40 is, in the present embodiment, of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm to 1.7 μm. Here, the laser diode 40 shown in FIG. 3 has a multilayered structure in which sequentially stacked from the unit substrate 230 side is: an n-electrode layer 40a having a surface contact and bonded with the second unit electrode 451; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode layer 40i. The upper surface of the p-electrode layer 40i, which is equivalent to the upper surface of the laser diode 40, has grooves 55 extending in X-axis direction and corresponding to the ridge structure of laser diode. The ridge structure is formed of concavity and convexity that exist on the p-electrode layer side and ranges over the clad layer, and is provided for confining the laser light and concentrating it on the light-emission center. Here, the n-electrode layer 40a and the p-electrode layer 40i may be formed of, for example, gold (Au) or Au alloy with thickness of approximately 5 μm.

As described above, the laser diode 40 has a structure in which a multilayer including an active layer 40e is sandwiched between the n-electrode layer 40a and the p-electrode layer 40i. Here, the n-electrode layer 40a is located on the side opposite to the ridge structure and the active layer 40e is located closer to the p-electrode layer 40i than the n-electrode layer 40a. Accordingly, the light-emission center 4000 is located farther from the joining surface 2300 of the unit substrate 230 in Z-axis direction when the n-electrode layer 40a is bonded onto the unit substrate 230 as described above than when the p-electrode layer 40i is bonded onto the unit substrate 230. Consequently, alignment of the laser diode 40 with the unit substrate 230 can be performed by means of a positioning jig having a flat surface when the laser diode 40 is bonded onto the unit substrate 230. Specifically, the position of the laser diode 40 relative to the unit substrate 230 can be determined by butting a portion of the light-emitting surface 400 of the laser diode 40 on the unit substrate 230 side that does not include the light-emission center 4000 and at least a portion of the surface of the first unit electrode 450 against the flat surface of the positioning jig. In doing so, at least the light-emission center 4000 is prevented from suffering mechanical stress.

When the n-electrode layer 40a is bonded to the unit substrate 230, the ridge structure including the grooves 55 lies in the upper surface of the laser diode 40 as described above. Therefore, in the head manufacturing, the ridge structure (grooves 55) can be used as a mark that is to be aligned with the additional markers 120 and 121 when alignment of the slider 22 and light source unit 23 in Y-axis direction is performed with use of the additional markers 120 and 121.

On the front and rear cleaved surfaces of the multilayered structure of the laser diode 40, respectively formed are reflective layers 510 and 511 for exciting the oscillation by total reflection. The outer surface of the reflective layer 510 on the joining surface 2300 side is a light-emission surface 400. Further, in the reflective layer 510, there is an opening 5100 in the position of the active layer 40e including the light-emission center 4000. Furthermore, in the reflective layer 511, and there is an opening 5110 in the position of the active layer 40e including the rear light-emission center 4001. The positions of the openings 5100 and 5110 are set in such a way that an alignment light 70 that enters the laser diode 40 from the opening 5110 is emitted from the opening 5100.

Referring again to FIG. 3, the n-electrode layer 40a of the laser diode 40 and the second unit electrode 451 of the unit substrate 230 can be bonded to each other by soldering using one of lead-free solders such as Au—Sn alloy 52, for example. Alternatively, they can be bonded together by using a conductive adhesive resin. Here, preferably the laser diode 40 is bonded onto the unit substrate 230 in such a way that the distance $D_{REC}$ between the light-emitting surface 400 of the laser diode 40 and the surface 4500 of the first unit electrode 450 provided on the joining surface 2300 in the direction perpendicular to the surface 4500 (X-axis direction) is 0 or more, and 5 μm or less.

Figure 4:
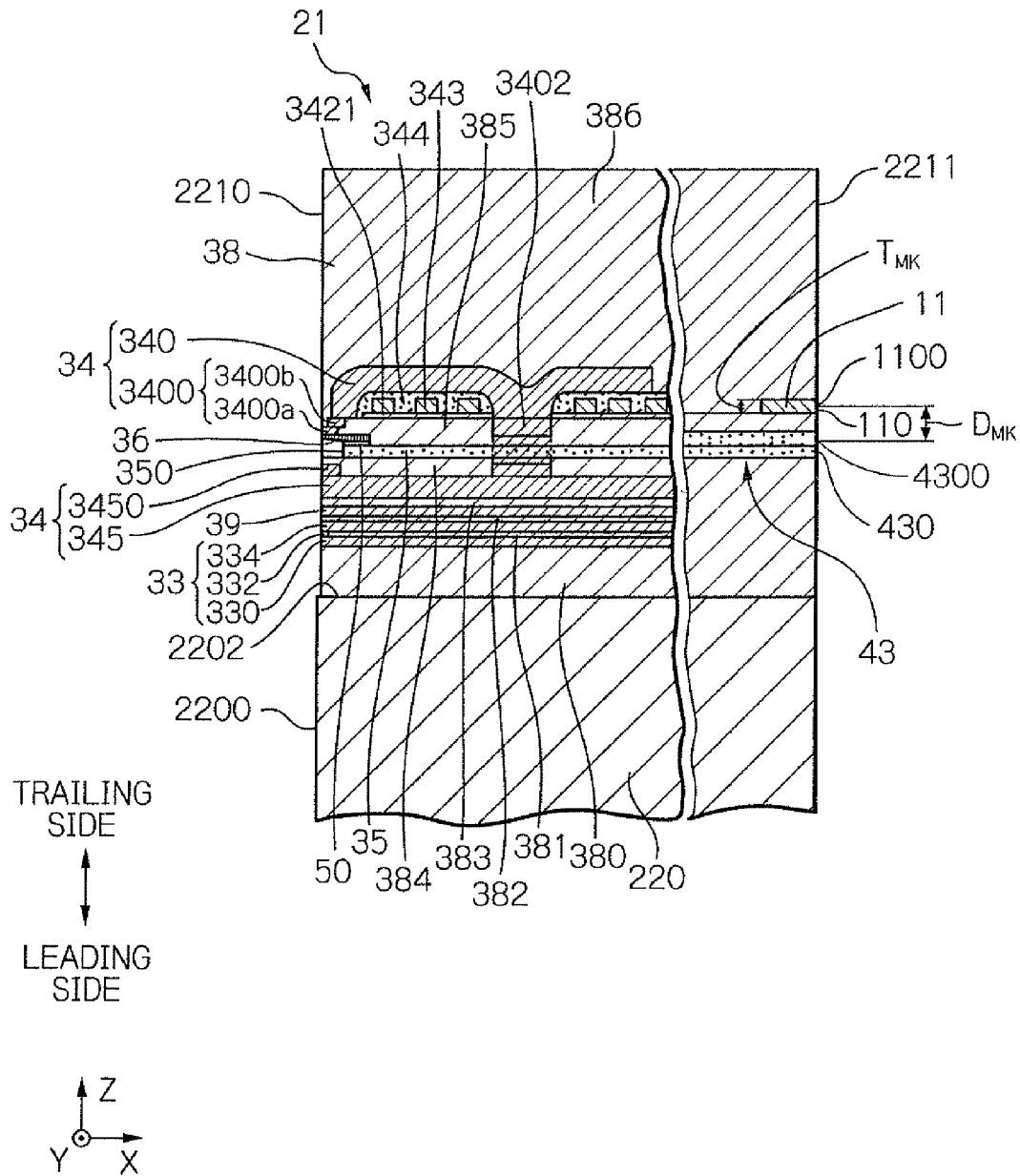
FIG. 4 shows a cross-sectional view taken by plane A in FIG. 3, schematically illustrating the configuration of the head element and its vicinity in the thermally-assisted magnetic recording head.

FIG. 4 shows a cross-sectional view taken by plane A in FIG. 3, schematically illustrating the configuration of the head element 32 and its vicinity in the thermally-assisted magnetic recording head 21.

As shown in FIG. 4, the MR element 33 is formed on a base layer 380 that is formed of an insulating material such as $Al_2O_3$ (alumina), $SiO_2$ and stacked on the element-integration surface 2102. The MR element 33 includes: an MR multilayer 332; and a lower shield layer 330 and an upper shield layer 334 which sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-CMR) multilayer that utilizes CPP-GMR effect; or a tunnel magnetoresistive (TMR) multilayer that utilizes TMR effect. In the case that the MR multilayer 332 is a CPP-GMR multilayer or a TMR multilayer, the upper and lower shield layers 334 and 330 act as not only magnetic shields but also electrodes.

Referring also to FIG. 4, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 includes: a first main pole portion 3400a reaching the head end surface 2210 and having a small width $W_P$ (FIG. 5) in the track width direction; and a second main pole portion 3400b located on the first main pole portion 3400a and at the rear (+X side) of the portion 3400a. The first main pole portion 3400a has an end surface 3400e (FIG. 5) with a shape of, for example, a rectangle, a square or a trapezoid on the head end surface 2210. Here, the above-described width $W_P$, is the length of an edge in the track width direction (Y-axis direction) of the end surface 3400e, and defines the width of write field distribution in the track width direction (Y-axis direction). The width $W_P$ can be set to be, for example, 0.05 to 0.5 μm. The main magnetic pole 3400 is preferably formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 4, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk. The lower yoke layer 345 is formed of a soft-magnetic material, and its thickness is, for example, approximately 0.5 to 5 μm. Further, the lower shield 3450 is a part of the magnetic path, being connected with the lower yoke layer 345 and reaching the head end surface 2210. The lower shield 3450 is opposed to the main magnetic pole 3400 through the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400a to become steeper. As a result; jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Figure 5:
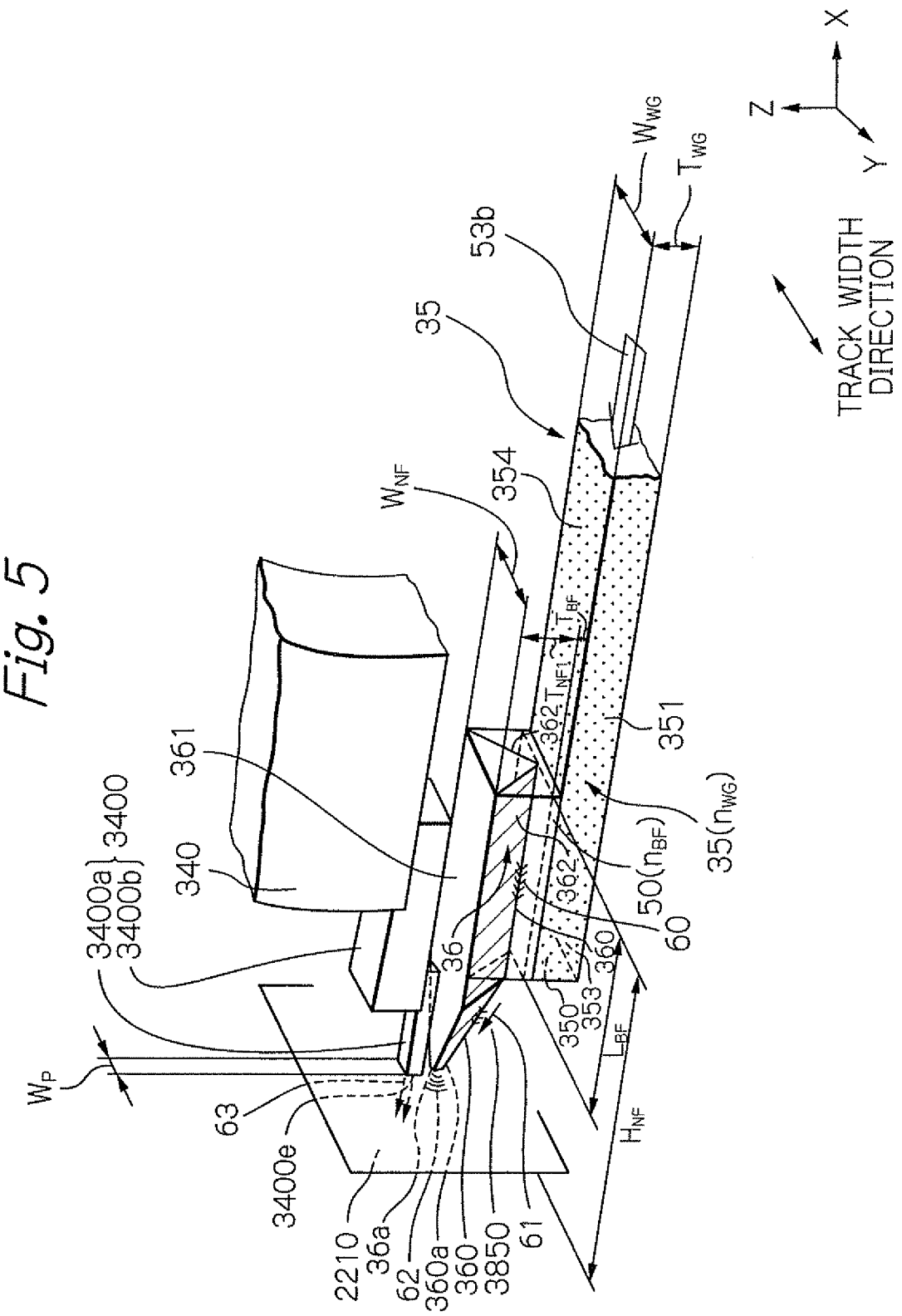
FIG. 5 shows a perspective view schematically illustrating the configuration of the waveguide, the surface plasmon generator and the main magnetic pole.

Further, also as shown in FIG. 5, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

Referring also to FIG. 4, laser light 53a, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the surface plasmon generator 36 is a near-field optical device that transforms the laser light (waveguide light) propagating through the waveguide 35 into near-field light. A part on the head end surface 2210 side of the waveguide 35 and the surface plasmon generator 36 are provided between the lower shield 3450 (lower yoke layer 345) and the main magnetic pole 3400 (upper yoke layer 340). Further, a portion of the upper surface (side surface) of the waveguide 35 on the head end surface 2210 side is opposed to a portion of the lower surface (including a propagation edge 360 (FIG. 5)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon generator 36 in a surface plasmon mode. A detailed explanation of the waveguide 35, the buffering portion 50 and the surface plasmon generator 36 will be given later with reference to FIG. 5.

As also shown in FIG. 4, a marker layer 11 is provided on the head end surface 2211 side. The marker layer 11 is made of a metal such as Au (gold), Cu (copper) or NiFe that reflects alignment light 70 (FIG. 3) used in the "semi-active alignment" according to the present invention, which will be detailed later. An end surface of the marker layer 11 exposed in the head end surface 2211 acts as the marker 110. The marker layer 11 is provided above the element-integration surface 2202 of the slider substrate 220 and is at a predetermined distance $D_{MK}$ from the spot-size converter 43 (optical system 31) in the direction perpendicular to the element-integration surface 2202 (Z-axis direction). The distance $D_{MK}$ is the distance between the center 4300 of the light-receiving end surface 430 and the center 1100 of the marker 110 in Z-axis direction. The distance $D_{MK}$ is determined by the thicknesses of the spot-size converter 43 and the marker layer 11 and the thickness of a portion of the overcoat layer sandwiched between the spot-size converter 43 and the marker layer 11. These thicknesses are controlled with an ultrahigh accuracy within ±±50 nm or less, achieved by thin-film formation technology. Consequently, the distance $D_{MK}$, that is, the position of the marker 110 with respect to the light-receiving end surface 430 can be set with an ultrahigh accuracy.

The thickness $T_{MK}$ of the marker layer 11 is equivalent to the width of the marker 110 in Z-axis direction. The width of the marker 110 is set to 0.3 μm, for example, so that the marker 110 can be identified under a microscope during alignment, or a sufficient amount of alignment light is reflected by the marker 110. While the marker layer 11 in FIG. 4 is provided on the trailing side (+Z side) of the spot-size converter 43 (optical system 31), the marker layer 11 may be provided on the leading side (−Z side).

FIG. 5 shows a perspective view schematically illustrating the configuration of the waveguide 35, the surface plasmon generator 36 and the main magnetic pole 3400. In the figure, the head end surface 2210 is positioned at the left side, the surface 2210 including positions where write field and near-field light are emitted toward the magnetic recording medium.

As shown in FIG. 5, the configuration includes the waveguide 35 for propagating laser light (waveguide light) 53b used for generating near-field light toward the end surface 350, and the surface plasmon generator 36 that has a propagation edge 360 as an edge on which surface plasmon excited by the laser light (waveguide light) 53b propagates. The surface plasmon generator 36 further includes a near-field light generating end surface 36a that reaches the head end surface 2210 and is a destination for the excited surface plasmon. Further, a buffering portion 50 is a portion sandwiched between a portion of the side surface 354 of the waveguide 35 and a portion of the lower surface 362 including the propagation edge 360 of the surface plasmon generator 36. That is, a portion of the propagation edge 360 is covered with the buffering portion 50. The buffering portion 50 acts for coupling the waveguide light 53b with the surface plasmon generator 36 in a surface plasmon mode. Further, the propagation edge 360 plays a role of propagating the surface plasmon excited by the waveguide light 53b to the near-field light generating end surface 36a. Here, side surfaces of the waveguide 35 are defined as, out of end surfaces surrounding the waveguide 35, end surfaces other than the end surface 350 on the head end surface 2210 side and the light-receiving end surface 352 on the opposite side. These side surfaces serve as surfaces on which the propagating waveguide light 53b can be totally reflected in the waveguide 35 that corresponds to a core. In the present embodiment, the side surface 354 of the waveguide 35, a portion of which is in surface contact with the buffering portion 50, is the upper surface of the waveguide 35. And, the buffering portion 50 may be a portion of the overcoat layer 38 (FIG. 2), or may be provided as a new layer other than the overcoat layer 38.

Specifically, the waveguide light 53b, which has advanced to near the buffering portion 50, is involved with the optical configuration including the waveguide 35 with a refractive index $n_{WG}$, the buffering portion 50 with a refractive index $n_{BF}$ and the surface plasmon generator 36 made of a metal, and induces a surface plasmon mode on the propagation edge 360 of the surface plasmon generator 36. That is, the waveguide light couples with the surface plasmon generator 36 in a surface plasmon mode. The induction of the surface plasmon mode becomes possible by setting the refractive index $n_{BF}$ of the buffering portion 50 to be smaller than the index $n_{WG}$ of the waveguide 35 ($n_{BF} < n_{WG}$). Actually, evanescent light is excited within the buffering portion 50 under an optical boundary condition between the waveguide 35 as a core and the buffering portion 50. Then, the evanescent light couples with the fluctuation of electric charge excited on the metal surface (propagation edge 360) of the surface plasmon generator 36, and induces the surface plasmon mode, thereby there is excited surface plasmon 60. To be exact, there excited is surface plasmon polariton in this system because surface plasmon as elementary excitation is coupled with an electromagnetic wave. However, the surface plasmon polariton will be hereinafter referred to as surface plasmon for short. The propagation edge 360 is located closest to the waveguide 35 on the inclined lower surface 362 of the surface plasmon generator 36, and is just an edge where electric field tends to converge; thus surface plasmon can easily be excited on the edge 360.

In the light source and optical system as shown in FIGS. 2, 4 and 5, the laser light emitted from the light-emission center 4000 of the laser diode 40 preferably has TM-mode polarization in which the oscillation direction of electric field of the laser light is along Z-axis. Further, the waveguide light 53b accordingly have a linear polarization in which the oscillation direction of electric field of the laser light is Z-axis direction, that is, perpendicular to the layer surface of the waveguide 35. Setting the polarization enables the waveguide light 53b propagating through the waveguide 35 to be coupled with the surface plasmon generator 36 in a surface plasmon mode.

Further, as shown in FIG. 5, the near-field light generating end surface 36a of the surface plasmon generator 36 is located close to the end surface 3400e of the main magnetic pole 3400 reaching the head end surface 2210, and is positioned on the leading side (−Z side) of the end surface 3400e and on the trailing side (+side) of the lower shield 3450. The distance between the near-field light generating end surface 36a and the end surface 3400e is preferably set to be a sufficiently small value of, for example, 100 nm or less. In the thermally-assisted magnetic recording, the near-field light generating end surface 36a functions as a main heating action part, and the end surface 3400e functions as a writing action part. Therefore, by setting the distance as described above, write field with a sufficiently large gradient can be applied to a portion of the magnetic recording layer of the magnetic disk, the portion having been sufficiently heated.

The propagation edge 360 extends to the near-field light generating end surface 36a. Further, in the present embodiment, a portion of the propagation edge 360 on the end surface 36a side (on the head end surface 2210 side) has a shape of straight line or curved line extending so as to become closer to the end surface 361 of the surface plasmon generator 36 as going toward the near-field light generating end surface 36a, the end surface 361 being opposite to the propagation edge 360. Surface plasmon 60 excited on the propagation edge 360 propagates on the propagation edge 360 along the direction shown by arrows 61. The propagation edge 360 is made rounded to prevent surface plasmon from running off from the edge 360, and thus to prevent the degradation of light use efficiency.

The near-field light generating end surface 36a of the surface plasmon generator 36, in the present embodiment, has an isosceles triangle shape in which one apex on the leading side (−Z side) is the end of the propagation edge 360. Thus, surface plasmon 60 propagating on the propagation edge 360 reaches the near-field light generating end surface 36a having an apex 360a as a destination of the edge 360. As a result, the surface plasmon 60, namely, electric field converges in the near-field light generating end surface 36a. Thereby near-field light 62 is emitted from the end surface 36a toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Further, in the present embodiment, the waveguide 35 has a cross-section taken by YZ-plane of a rectangular or trapezoidal shape. The width $W_{WG}$ in the track width direction (Y-axis direction) of a portion of the waveguide 35 near the end surface 350 on the head end surface 2210 side may be, for example, in the range approximately from 0.3 to 0.7 μm. Further, the thickness $T_{WG}$ (in Z-axis direction) of the waveguide 35 may be, for example, in the range approximately from 0.3 to 0.7 μm.

Further, the side surfaces of the waveguide 35: the upper surface 354, the lower surface 353, and both the side surfaces 351 in the track width direction (Y-axis direction) have a surface contact with the overcoat layer 38 (FIG. 2), that is, the insulating layers 384 and 385 (FIG. 4), except a portion having a surface contact with the buffering portion 50. Here, the waveguide 35 is formed of a material with a refractive index $n_{WG}$ higher than the refractive index $n_{OC}$ of the constituent material of the overcoat layer 38, made by using, for example, a sputtering method. For example, in the case that the wavelength $\lambda_L$ of the laser light is 600 nm and the overcoat layer 38 is formed of $Al_2O_3$ (n=1.63), the waveguide 35 can be formed of, for example, $SIO_xN_Y$ (n=1.7–1.85), $Ta_2O_5$ (n=2.16), $Nb_2O_5$ (n=2.33), TiO (n=2.3–2.55) or $TiO_2$ (n=2.3–2.55). The just-described material structure of the waveguide 35 enables the propagation loss of laser light 53b to be reduced due to the excellent optical characteristics of the constituent material. Further, the waveguide 35 that acts as a core can provide the total reflection in all the side surfaces of the waveguide 35 due to the existence of the overcoat layer 38 acting as a clad. As a result, more amount of laser light 53b can reach the position of the buffering portion 50, which improves the propagation efficiency of the waveguide 35.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53b, and being in the range of, for example, approximately 10 to 100 nm. And the surface plasmon generator 36 can have a thickness $T_{NF1}$ (in Z-axis direction) sufficiently smaller than the wavelength of the laser light 53b, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of $Ta_2O_5$ (n=2.16), the buffering portion 50 can be formed of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide 35 and the propagation edge 360, is preferably in the range of 0.5 to 5 μm, and is preferably larger than the wavelength λ of the laser light 53b. Further, the thickness $T_{BF}$ (in Z-axis direction) of the buffering portion 50 is preferably in the range of 10 to 200 nm.

The optical system that is provided in the head element part 221 and generates light for thermal assist is not limited to the above-described one. For example, as an alternative, the laser light generated from the laser diode 40 may be emitted directly from the end surface 350 of the waveguide 35 that reaches the head end surface 2210, instead of providing the surface plasmon generator 36 for generating near-field light. The emitted light could heat the magnetic recording layer of the magnetic disk to perform thermal assist. As another alternative, a plasmon antenna made of a metal piece may be provided at the end surface 350 of the waveguide 35 that reaches the head end surface 2210. The plasmon antenna may be irradiated with the waveguide light propagating through the waveguide 35; thus near-field light could be emitted toward the magnetic disk.

Figure 6A:
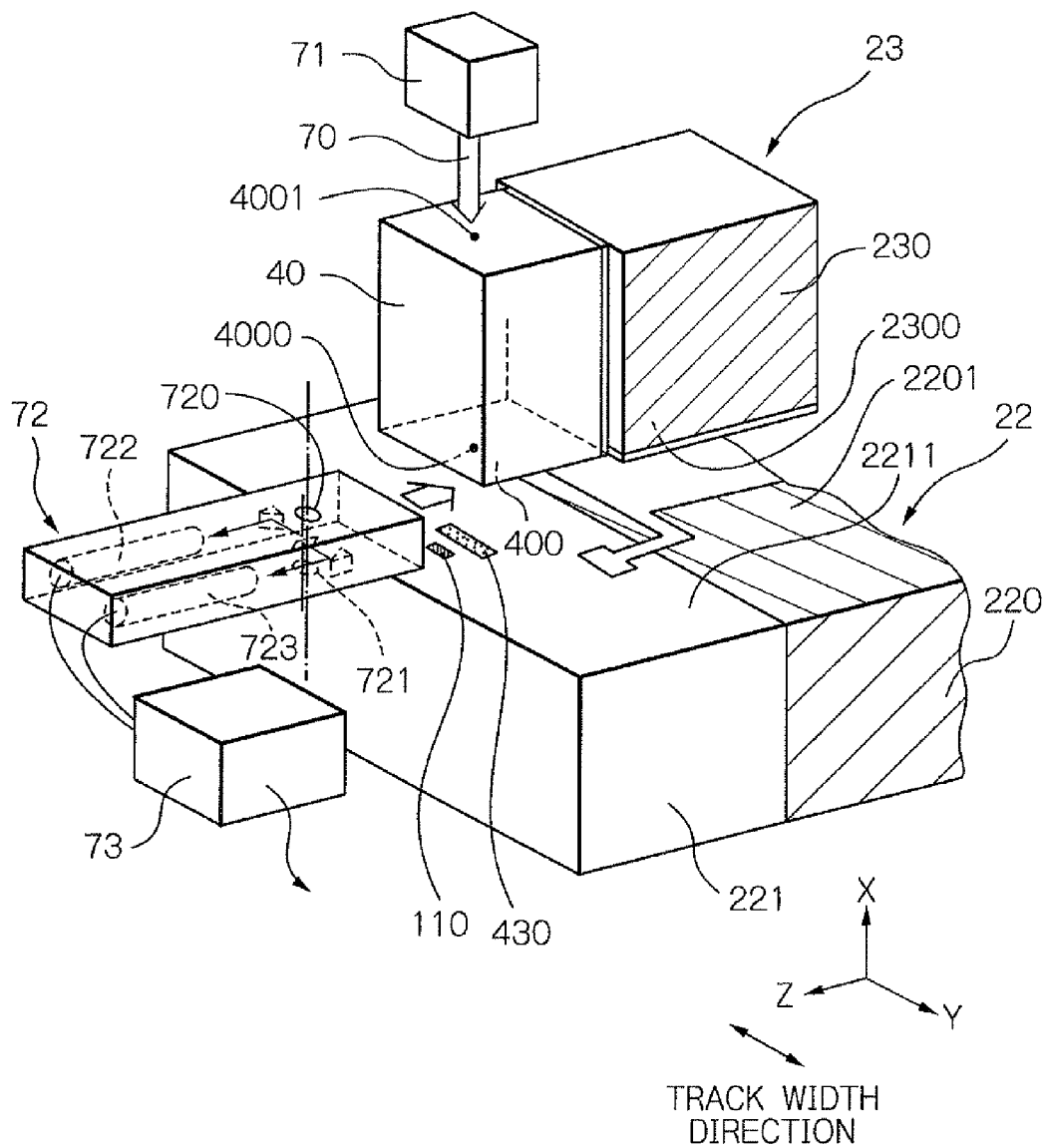

FIGS. 6a to 6c show schematic views illustrating one embodiment of a method for manufacturing the thermally-assisted magnetic recording head 21 using the semi-active alignment according to the present invention.

As illustrated in FIG. 6a, the thermally-assisted magnetic recording head 21 according to the present invention is fabricated by joining and bonding a light source unit 23 and a slider 22 with each other. During the fabrication, the relative positions of the slider 22 and the light source unit 23 are determined in such a way that laser light emitted from the light-emission center 4000 located in the light-emitting surface 400 of the laser diode 40 is most incident at the light-receiving end surface 430 provided in the end surface 2211 of the head element part 221.

According to the embodiment shown in FIG. 6a, first the light source unit 23 and the slider 22 are attached to an alignment apparatus 74 (FIG. 6b1) which adjusts the relative positions of the light source unit 23 and the slider 22. Then, the bonding surface 2300 of the unit substrate 230 and the back surface 2201 of the slider substrate 220 are opposed to each other, and an alignment light source 71 is used to irradiate a rear light-emission center 4001 of the laser diode 40 with alignment light 70 to cause the alignment light 70 to enter the laser diode 40. The alignment light 70 may be a laser light or a monochromatic light which have a wavelength $\lambda_{ALM}$ that passes through the semiconductor material of the laser diode 40, or a light having a wavelength band including the wavelength $\lambda_{ALM}$. If the laser diode 40 is a GaAs-type laser diode, the wavelength $\lambda_{ALM}$ can be set to a value in the near-infrared band, for example 820 nm. The alignment light source 71 may be a laser diode or an electric lamp. The alignment light 70 that has entered the laser diode 40 passes through the laser diode 40 and is emitted from the light-emission center 4000.

Then, a multi-field-of-view microscope such as a dual-field-of-view camera 72 is inserted between the light source unit 23 and the slider 22. For allowing the insertion, the distance between the bonding surface 2300 (the first unit electrode 450) of the unit substrate 230 and the back surface 2201 (the back surface electrode 4100) of the slider substrate 220 is set to a value in the range of, for example, approximately 10 to 20 cm before or after the alignment light 70 is entered into the laser diode 40. The multi-field-of-view microscope captures the alignment light 70 emitted from the light-emission center 4000 and the light-receiving end surface 430 or the marker 110 which is in a predetermined positional relation with the light-receiving end surface 430, in different fields of view to enable the positional relation between the light-emission center 4000 and the light-receiving end surface 430 to be observed. In particular, the dual-field-of-view camera 72 includes two objective lenses 720 and 721 on its upper surface which faces the light-emission center 4000 and on its lower surface which faces the light-receiving end surface 430, respectively. The optical axes of the objective lenses 720 and 721 are in a predetermined positional relation with each other (they coincide with each other in the embodiment shown in FIG. 6*a*). An image of the light-emission center 4000 (alignment light 70) and an image of the light-receiving end surface 430 (marker 110) captured by the objective lenses 720 and 721 are transmitted through an optical system including components such as prisms and imaging lenses, are received at image pickup devices 722 and 723, respectively, and are converted to electrical signals. The image pickup devices 722 and 723 may be image pickup tubes or solid-state image pickup devices such as CCDs. The electrical signals converted from the images are sent to an image recognition system 73. The image recognition system 73 recognizes the images and enables the alignment apparatus 74 to adjust the positions of the light source unit 23 and the slider 22 on the basis the recognized images so that the light source unit 23 and the slider 22 are positioned in a desired positional relation with each other.

Here, an implementation will be described below in which the dual-field-of-view camera 72 including objective lenses 720 and 721 with a common optical axis OX is used to recognize alignment light 70 emitted from the light-emission center 4000 and the light-receiving end surface 430 as shown in FIG. 6*b*1. First, the dual-field-of-view camera 72 is used to recognize an image of the alignment light 70 and an image of the light-receiving end surface 430. Then, the light source unit 23 and the slider 22 are moved relative to each other in YZ plane until the images coincide with each other. When the images coincide with each other, the light-emission center 4000 and the center 4300 of the light-receiving end surface 430 are on the common optical axis OX of the objective lenses 720 and 721. The two-field-of-view camera 72 is then retracted from between the light source unit 23 and the slider 22. Then the distance between the light source unit 23 and the slider 22 in X-axis direction is reduced without changing their relative positions in YZ plane until the light source unit 23 and the slider 22 come into contact with each other, thereby determining their relative positions.

An alternative of the alignment shown in FIG. 6*b*1 will be described in which the dual-field-of-view camera 72 including objective lenses 720 and 721 with a common optical axis OX is used to recognize alignment light 70 emitted from the light-emission center 4000 and a marker 110 that is in a predetermined positional relation with the light-receiving end surface 430. First, the dual-field-of-view camera 72 recognizes an image of the alignment light 70 and an image of the marker 110. Then, the light source unit 23 and the slider 22 are moved relative to each other in Y-Z plane until the images coincide with each other. When the images coincide with each other, the light-emission center 4000 and the center 1100 of the marker 110 are on the common optical axis OX of the objective lenses 720 and 721. The light source unit 23 and the slider 22 are then further moved relative to each other by a predetermined amount in YZ plane. The predetermined amount and the direction of the movement are the distance between the center 4300 of the light-receiving end surface 430 and the center 1100 of the marker 110 and the direction from the center 1100 to the center 4300, respectively. For example, in the embodiment illustrated in FIG. 2, the light source unit 23 is moved in −Z direction by the distance $D_{MK}$ with respective to the slider 22 (as indicated by arrow 75 in FIG. 6*b*2). Then, the dual-field-of-view camera 72 is retracted from between the light source unit 23 and the slider 22. Then the distance between the light source unit 23 and the slider 22 in X-axis direction is reduced without changing their relative positions in YZ plane until the light source unit 23 and the slider 22 come into contact with each other, thereby determining their relative positions.

Lastly, the light source unit 23 and the slider 22 in contact with each other are bonded together as shown in FIG. 6*c*. Here, an example will be described in which a conductive resin is used for the bonding. A conductive UV curable resin such as UV curable epoxy resin or UV curable acrylic resin with an added conductive filler is applied to the surface of the first unit electrode 450 of the light source unit 23 beforehand. Here, the conductive UV curable resin may also be applied to the surface of the back surface electrode 4100 of the slider 22 beforehand. Alternatively, the conductive UV curable resin may be applied only on the surface of the back surface electrode 4100. The light source unit 23 and the slider 22 are then brought into contact with each other and, with the first unit electrode 450 and the back surface electrode 4100 being joined together, the conductive UV curable resin at the interface is irradiated with UV light 76 to cure the conductive UV curable resin to bond the light source unit 23 and the slider 23 together. With this, a thermally-assisted magnetic recording head 21 is completed.

In an alternative of the bonding, the light source unit 23 and the slider 22 may be bonded by soldering using one of lead-free solders such as Au—Sn alloy, instead of using a conductive UV curable resin. In that case, an evaporated film of Au—Sn alloy is deposited on the surface of the first unit electrode 450 or the surface of the back surface electrode 4100 or both to a thickness in the range of approximately 0.7 to 1 μm, for example. Then the light source unit 23 and the slider 22 are brought into contact with each other and, with the first unit electrode 450 and the back surface electrode 4100 being joined together, heating is performed with a hotplate or the like under a hot-air blower to approximately 200 to 300° C. to bond the light source unit 23 onto the slider 22. Instead of bonding using a conductive resin or solder described above, Au—Au ultrasonic joining may be used to bond the light source unit 23 and the slider 22. If neither the light source unit 23 nor the slider 22 has electrodes at the bonding areas, a non-conductive UV curable resin can be applied to the bonding surface 2300 and/or the back surface 2201 to bond the light source unit 23 and the slider 22.

Figure 7A:
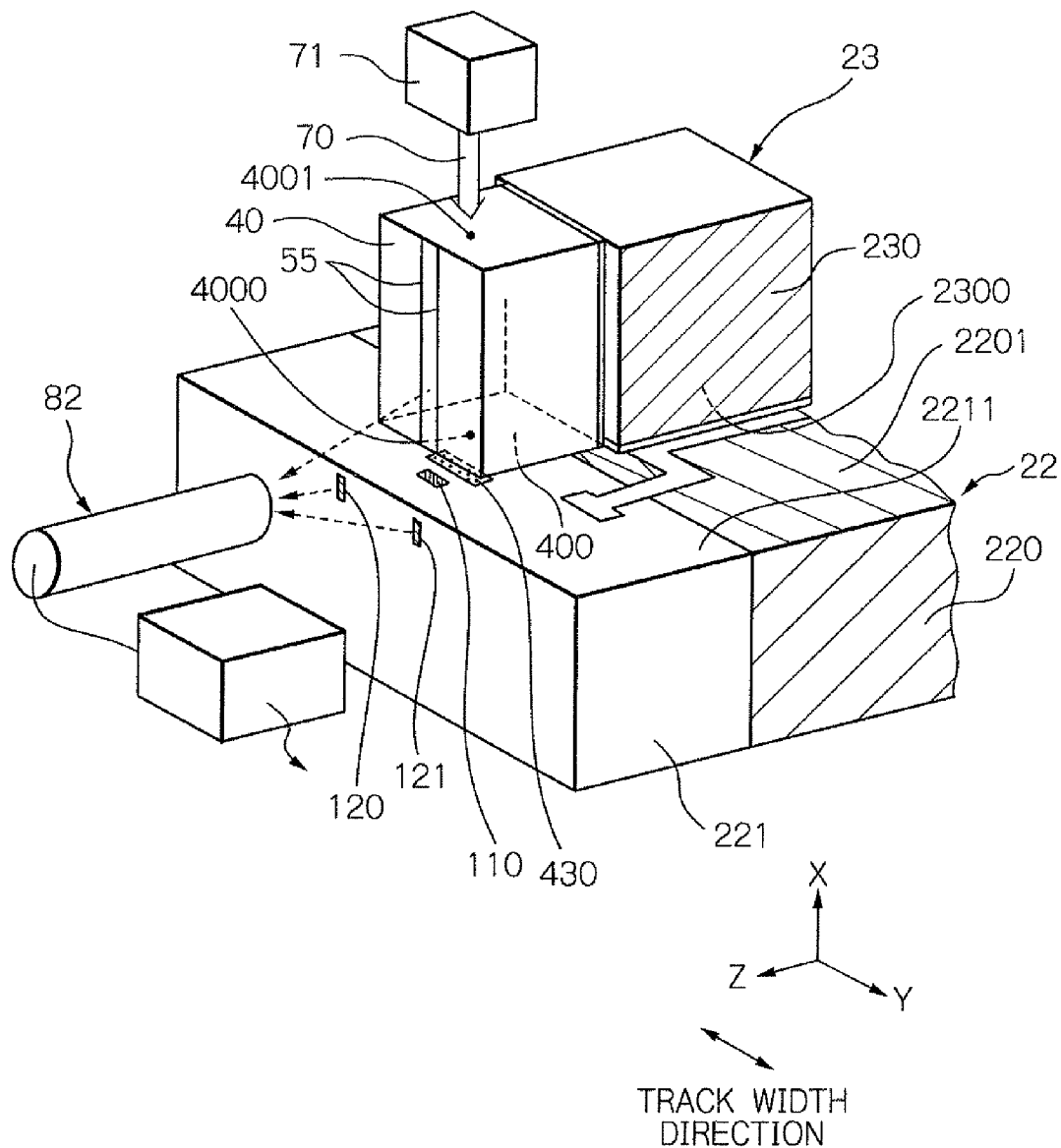
FIGS. 7a to 7c show schematic views illustrating another embodiment of a method for manufacturing the thermally-assisted magnetic recording head using the semi-active alignment according to the present invention.
Figure 7B:
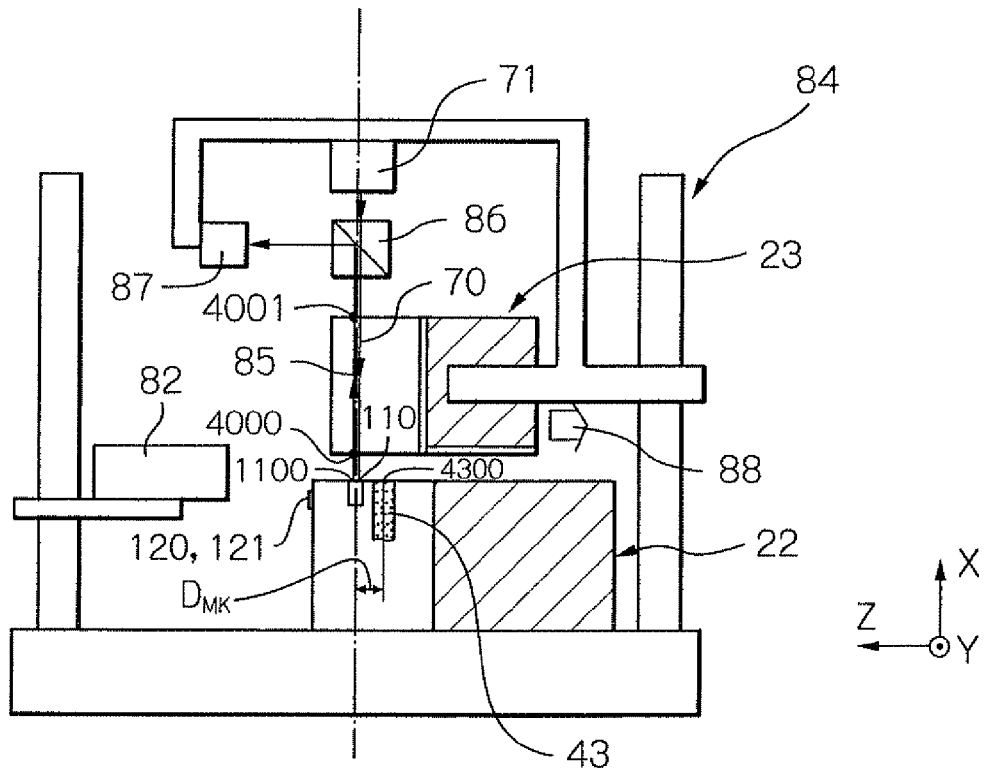
Figure 7C:
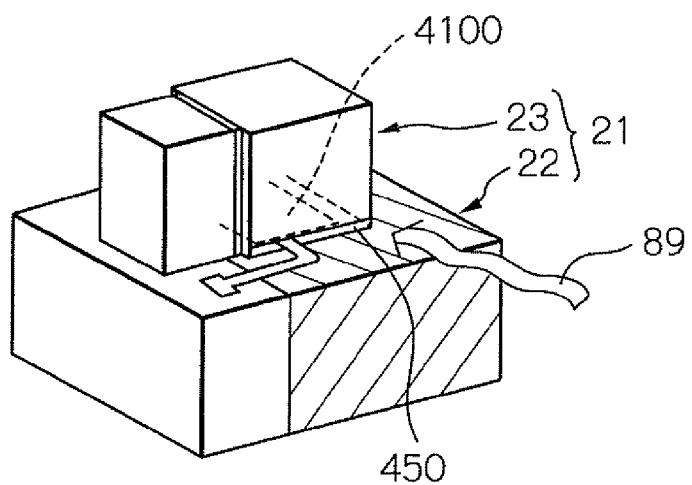

FIGS. 7*a* to 7*c* show schematic views illustrating another embodiment of a method for manufacturing the thermally-assisted magnetic recording head 21 using the semi-active alignment according to the present invention.

According to the embodiment illustrated in FIG. 7*a*, first a light source unit 23 and a slider 22 are attached to an alignment apparatus 84 (FIG. 7*b*) which adjusts the relative positions of the light source unit 23 and the slider 22. Then, the bonding surface 2300 of the unit substrate 230 and the back surface 2201 of the slider substrate 220 are opposed to each other and an alignment light source 71 is used to irradiate a rear light-emission center 4001 of the laser diode 40 with alignment light 70 to cause the alignment light 70 to enter the laser diode 40. The alignment light 70 that has entered the laser diode 40 is transmitted through the laser diode 40 and then emitted from the light-emission center 4000. The distance between the light-emitting surface 400 of the laser diode 40 and the head end surface 2211 (back surface 2201) is preferably set to a value between or equal to 2 μm and 20 μm before or after the alignment light 70 is entered in the laser diode 40. By setting the distance to such a sufficiently small value, the alignment light 70 emitted from the light-emission center 4000 and reflected back from the marker 110 can more reliably reenter the laser diode 40 from the light-emission center 4000.

Then, as shown in FIG. 7b, an alignment camera 82 for observing the element-integration surface 2202 at the front is used to recognize an image of the ridge structure including grooves 55 in the upper surface of the laser diode 40 and images of additional markers 120 and 121. Then, the light source unit 23 and the slider 22 are moved relative to each other in Y-axis direction until the images are placed in a predetermined positional relation with each other in the track width direction (Y-axis direction). In the embodiment illustrated in FIG. 7b, the center line of the ridge structure along X-axis direction and the center lines of the additional markers 120 and 121 along X-axis direction are aligned with each other in Y-axis direction.

The light source unit 23 and the slider 22 are then moved relative to each other in Z-axis direction in such a way that the alignment light 70 emitted from the light-emission center 4000 is reflected back from the marker 110 as reflected light 85, reenters the laser diode 40 from the light-emission center 4000, passes through the laser diode 40 and is emitted from the rear light-emission center 4001. The light source unit 23 and the slider 22 are moved relative to each other in Z-axis direction until the intensity of the reflected light 85 emitted from the rear light-emission center 4001 reaches the maximum value, then the movement is stopped. The relative positions of the light-emission center 4000 and the center 4300 of the light-receiving end surface 430 at the time the movement has been stopped is set as the reference positions for alignment in Z-axis direction. A beam splitter 86 such as a combination of a half mirror and a prism is provided between the alignment light source 71 and the rear light-emission center 4001 (the laser diode 40) to enable the reflected light 85 emitted from the rear light-emission center 4001 after passing through the laser diode 40 to be detected at a photo-detector 87 such as a photodiode to monitor the intensity of the reflected light 85.

Then, the light source unit 23 and the slider 22 are further moved relative to each other by a predetermined distance in YZ plane from the alignment reference positions described above. The predetermined distance and the direction of the movement are the distance between the center 4300 of the light-receiving end surface 430 and the center 1100 of the marker 110 and the direction from the center 1100 to the center 4300, respectively. For example, in the embodiment shown in FIG. 2, the light source unit 23 is moved in −Z direction by the distance $D_{MK}$ with respective to the slider 22 (as indicated by arrow 88 shown in FIG. 7b). Then, the distance between the light source unit 23 and the slider 22 in X-axis direction is reduced until they come into contact with each other without changing their relative positions in YZ plane, thereby determining their relative positions.

Lastly, the light source unit 23 and the slider 22 in contact with each other are bonded together as illustrated in FIG. 7c. For the bonding, a UV curable resin such as a conductive UV curable resin (in conjunction with irradiation with UV light 89), soldering, or Au—Au ultrasonic joining can be used as described with respect to the embodiment shown in FIG. 6c. With the bonding, a thermally-assisted magnetic recording head 21 is completed.

Since the manufacturing methods described with respect to FIGS. 6a to 6c and FIGS. 7a to 7c use "semi-active alignment" that uses alignment light 70 to align the light source unit 23 and the slider 22 with each other, the alignment can be accomplished with a sufficiently high alignment accuracy, for example an accuracy within ±0.5 μm or a higher accuracy in a short processing time. In practice, the "semi-active alignment" according to the present invention does not require power supply probes to be applied to the electrodes of the light source. Therefore, the time required for alignment is reduced compared with conventional active alignment. Furthermore, since no head structure or proving facilities for probing are required, the manufacturing load can be kept low. In addition, in the "semi-active alignment" according to the present invention, the light-emission center of the light source can be directly recognized without having to rely on any marker, a high alignment accuracy can be achieved compared with the conventional passive alignment. Further, since a marker does not need to be added to the light-emitting surface of the light source, an increase of cost in provision of the light source can be avoided.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for manufacturing a thermally-assisted magnetic recording head in which a light source unit and a slider are joined to each other, the light source unit including a light source that is provided in a source-installation surface adjacent to a bonding surface of a unit substrate and has a light emitting surface including a light-emission center adjacent to the bonding surface, the slider including an optical system that is provided on an element-integration surface adjacent to an opposed-to-medium surface of a slider substrate and has a light-receiving end surface reaching a back surface opposite to the opposed-to-medium surface of the slider substrate, the manufacturing method comprising the steps of:
   causing a light emitted from an alignment light source to enter the light source from a surface opposite to the light emitting surface including the light-emission center of the light source while the bonding surface of the light source unit is opposed to the back surface of the slider substrate, the alignment light source being provided separately from the light source unit and being different from the light source;
   detecting the light that has passed through the light source and is emitted from the light-emission center to align the light-emission center of the light source unit with the light-receiving end surface of the slider; and
   bonding the light source unit to the slider in such a way that the bonding surface of the unit substrate and the back surface face each other.

2. The manufacturing method as claimed in claim 1, wherein:
   a multi-field-of-view microscope is inserted between the bonding surface of the light source unit and the back surface of the slider substrate; and
   an alignment of the light-receiving end surface and the light-emission center is performed by using the multi-field-of-view microscope in such a way that the light-receiving end surface or a marker that is in a predetermined positional relation with the light-receiving end surface is captured by a different field of view from a field of view that captures a light emitted from the light-emission center.

3. The manufacturing method as claimed in claim 2, wherein a dual-field-of-view microscope is used as the multi-field-of-view microscope, which comprises two objective lenses in respective upper and lower surfaces of the microscope, optical axes of the two objective lenses being in a predetermined positional relation with each other.

4. The manufacturing method as claimed in claim 1, wherein the light source unit and the slider are moved relative to each other from reference positions by a predetermined amount to align the light source unit and the slider with each other, the reference positions being positions in which the light-emission center and the light-receiving end surface are located when the light emitted from the light-emission center, reflected by a marker, reentering the light source, and then passing through the light source, is emitted from the surface opposite to the light emitting surface including the light-emission center, the marker being provided on the back surface of the slider substrate and being in a predetermined positional relation with the light-receiving end surface.

5. The manufacturing method as claimed in claim 4, wherein the alignment of the light source unit and the slider is performed using the reference positions in which the light-emission center and the light-receiving end surface are located when an intensity of the light that reenters the light source and is emitted from the surface opposite to the light emitting surface including the light-emission center becomes maximum.

6. The manufacturing method as claimed in claim 4, wherein a marker layer made of a material that reflects the light is formed at a position above the element-integration surface of the slider substrate and apart from the optical system with a predetermined distance in a direction perpendicular to the element-integration surface, and an end surface of the marker layer is used as the marker, the end surface reaching the back surface.

7. The manufacturing method as claimed in claim 4, wherein an alignment in a track width direction of the light source and the light-receiving end surface is performed by using an additional marker that is provided in the element-integration surface of the slider substrate and is in a predetermined positional relation with the light-receiving end surface in the track width direction.

8. The manufacturing method as claimed in claim 4, wherein a distance between the surface including the light-emission center of the light source and the back surface is set to be 2 micrometers or more and to be 20 micrometers or less when aligning the light-emission center of the light source unit and the light-receiving end surface of the slider with each other.

* * * * *